3,398,282
RADIATION DETECTOR WHOSE OUTPUT IS INDE-
PENDENT OF THE ENERGY DISTRIBUTION OF
INCIDENT RADIATION
Rolf Hosemann, Schorlemmerstrasse 6a, Berlin-Dahlem,
Germany, and Harald Warrikhoff, Spessartstrasse 9,
Berlin-Wilmersdorf, Germany
Filed Dec. 1, 1964, Ser. No. 415,129
36 Claims. (Cl. 250—83.6)

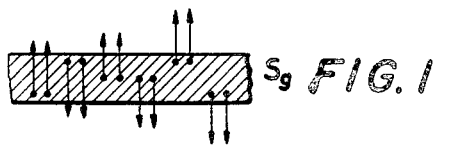
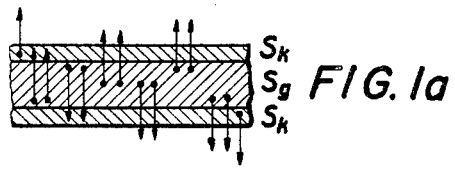
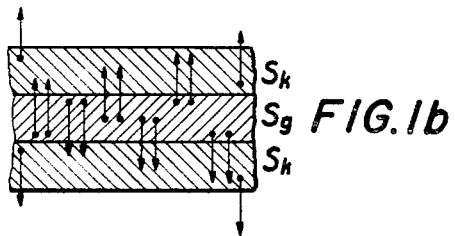
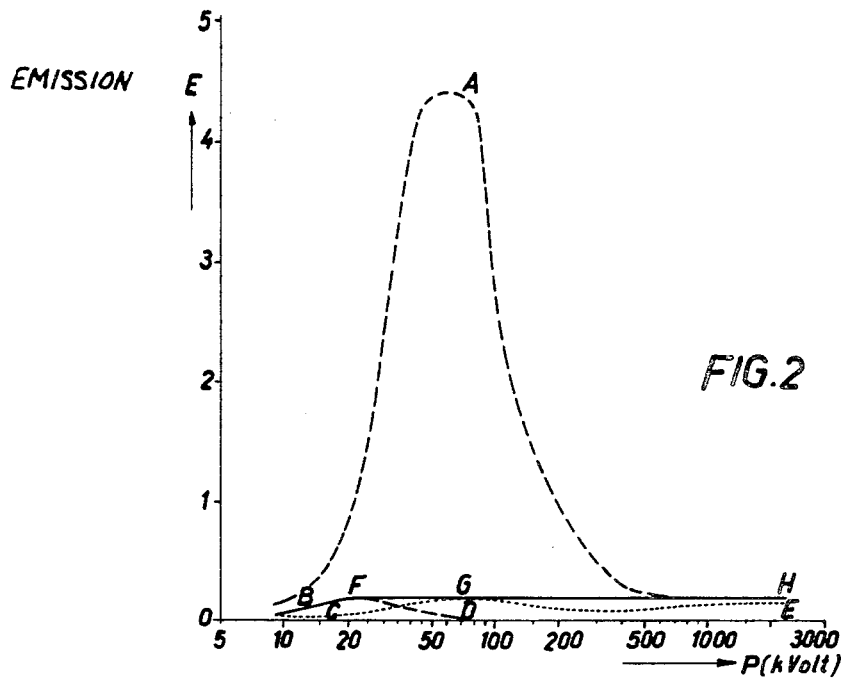

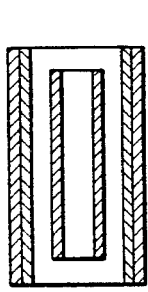 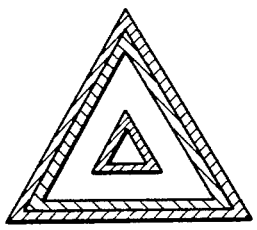 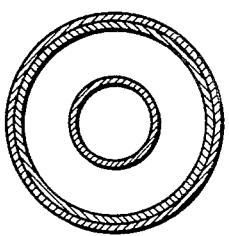 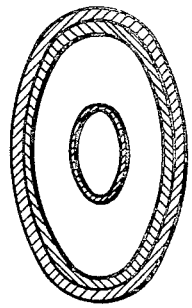
FIG.5a   FIG.5b   FIG.5c   FIG.5d
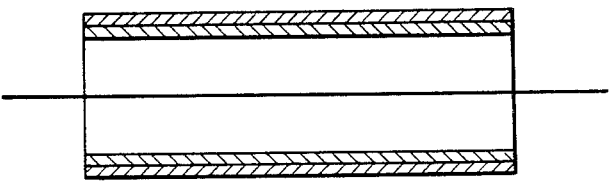
FIG.6
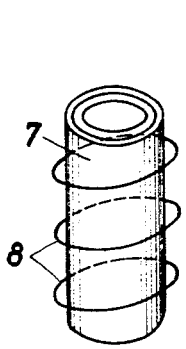 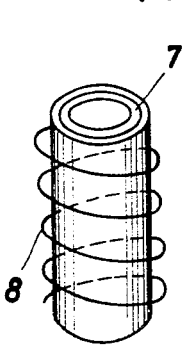 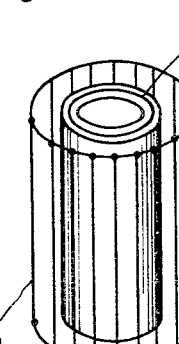 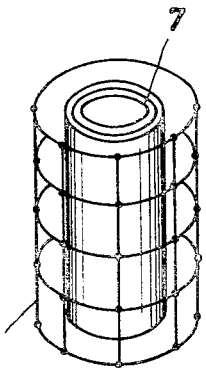
FIG.7a   FIG.7b   FIG.7c   FIG.7d United States Patent Office 3,398,282
Patented Aug. 20, 1968

ABSTRACT OF THE DISCLOSURE

A detector electrode structure composed of two electrodes at least one of which consists of a plurality of layers each made of a material and having a thickness such that the radiation responsive charge carrier emission characteristics of the layers combine to cause the net flow of charge carriers between the electrodes to be independent of the energy distribution of the incident radiation.

---

The present invention relates to instruments for measuring ionizing radiation; more specifically, to ionizing radiation measuring instruments the sensitivity of which is independent of the quantum energy of incident electromagnetic radiation, or independent of the kinetic energy of incident nuclear particles.

Instruments for measuring ionizing radiation generally include a radiation detector and a device for measuring the effect registered by the detector. Some proportion of the incident radiation is absorbed by the detector, and the absorbed energy is converted into the kinetic energy of electrical charge carriers. The extent of the absorption, and hence also that of the transformation of energy, depends to a great extent on the wavelength of the incident photons or on the kind and energy of the incident particles and on the absorption material.

Instruments for measuring ionizing radiation actually measure various quantities characterizing this radiation, such as the number of incident photons or particles per unit of area (the photon flux, or particle flux, or the intensity, which is the energy flux per unit time. One special type of measuring instrument, the dosimeter, measures the interaction between nuclear radiation and matter. that is, the energy supplied by radiation to an element of mass (the dose).

If a detector is considered which is sensitive to a specific type of radiation, for example, gamma rays then it can only be used for the particular purpose in question if its sensitivity is either independent of, or dependent in a known manner on, the wavelength of the photons (or the kinetic energy of the particles), and proportional to the value of the above-mentioned quantity characterizing the radiation. The former case is distinguished by the fact that it is not necessary to know the wavelength or wavelength distribution of the incident photons (or particles) in order to evaluate the measured effect. Thus, an air-wall ionization chamber measures the energy absorbed by air per unit of mass (dose) of gamma radiation, for example, independently of the wavelength of its photons, and a Faraday cage measures the charge and hence the number of incident electrons, independently of their energy. On the other hand, it is difficult to measure the number of photons incident on a counter tube because the response probability of a counter tube depends to a great extent on the wavelength of the photons. Even with a proportional counter tube (that is, one in which the energy pulse produced is proportional to the energy of the incident particle), the intensity of the incident radiation can only be measured if the wavelength distribution of the incident photons is known or can be determined, for example, with a discriminator.

The large number of known methods for influencing the wavelength dependency of ionizing radiation detectors reveals both the necessity for and the shortcomings of all of these methods.

With X-rays and gamma radiation, for example, efforts have been made to compensate for sensitivity maxima by means of a filter which weakens the effect of primary radiation. Apart from the fact that, for hard gamma radiation, considerable weight per unit area of filter is added, the dependency of the device on wavelength is only decreased in the range from the maximum towards harder radiations. Softer radiations, on the other hand, are prevented from reaching the actual detector. Windows of suitable dimensions in the filter layer admittedly allow the soft components of the nuclear radiation to be measured, but with this method, the direction of the incident radiation becomes critical.

Practical success in selecting a suitable detector material has been achieved only for dosimeters, in which the measuring effect is proportional to the energy absorbed by an air-equivalent wall material. On the other hand, Wilhelmi proved, for example, that the dose indicated by Geiger counters with air-equivalent counter-tube walls is highly dependent on wavelength. Bulatow was able to achieve wavelength independence over a relatively wide range by suitable matching of detector material (Sn) and gamma radiation filter (Pb). Even in this manner, however, it has not been possible to detect soft radiation components.

Sinclair and Sacharow have suggested mixing various elements to form a detector material which would permit dose measurement independently of wavelength using Geiger counters, but this technique is only successful over limited ranges of wavelength, as is the use of different elements side by side in the counter tube wall. It is possible to compensate for the difference in wavelength dependency of the various materials only if the sensitivity maximum due to one element coincides with the sensitivity minimum of another, or if the maxima of various elements can be combined in a manner such that the sum of the sensitivity curves, plotted as functions of wavelength, is relatively constant. The maxima of all elements, however, are close to their absorption discontinuities, so that only a relatively small range of wavelengths can be "levelled off" by this method.

Hess improved on this method, rendering a certain "shift" of such maxima possible by suitably selecting the thickness of the ionization chamber wall material, and by placing a plurality of different ionization chambers one behind the other, he also utilized the gamma-filter action of the chamber walls. Even this arrangement, however, is only independent of wavelength over a short range in practice.

The "suitable material composition of the electrodes" referred to in U.S. patent specification 3,067,331, only serves to achieve independence of wavelength with regard to the unit of dose, whereas the present invention specifies this material composition more precisely, and also teaches a device the sensitivity of which is independent of wavelength (quantum energy or kinetic energy) with respect to intensity, photon flux, or particle flux.

It is therefore an object of the present invention to provide a detector for ionizing radiation which avoids the drawbacks inherent in prior art devices.

It is a further object of the present invention to provide a detector for ionizing radiation wherein one or both detector electrodes are of multi-layer construction.

It is a further object of the present invention to provide an ionizing radiation detector wherein at least one of the electrodes is comprised of several layers of different materials and/or different thicknesses, in such a manner that the over-all response to radiation is independent of quantum energy, or kinetic energy and proportional to the time integral of the radiation intensity, or proportional to the photon or particle flux of the radiation, or proportional to the dose absorbed in a given material.

It is still another object of the present invention to provide an ionizing radiation detector utilizing at least one multi-layer electrode, wherein the charge carriers emitted by a given layer, dependent on the material and thickness of the layer, and the quantum energy or kinetic energy of the nuclear radiation, are absorbed by the other material layers in such a manner that the resultant charge transport between the electrodes is proportional to the time integral of the radiation intensity, or proportional to the photon or particle flux of the nuclear radiation, or proportional to the dose absorbed in a given material.

Additional objects and advantages of the present invention will become apparent upon consideration of the following description when taken in conjunction with the accompanying drawings in which:

FIGURES 1, 1a, 1b are schematic cross-sectional views showing several electrode layer configurations.

FIGURE 2 is a graph plotting the emission per unit dose (E) as a function of photo energy (P) for several electrode materials.

FIGURES 5a through 5d are cross-sectional views illustrating suitable electrode shapes usable with detectors according to the present invention.

FIGURE 6 is a cross-sectional view showing still a further construction of an ionizing radiation detector according to the present invention.

FIGURES 7a through 7d are perspective views of several examples of radiation detector electrodes wherein the counter electrode is in the form of a wire loop, spiral or net around the base electrode.

Figure 3:
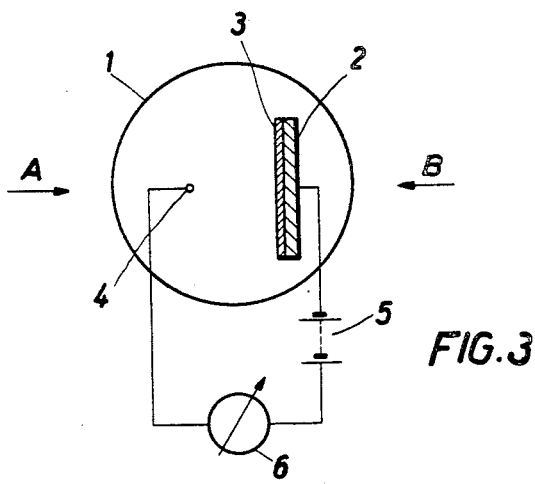
FIGURE 3 is a schematic view of an embodiment of the present invention in the form of an ionization chamber, employing a multi-layer electrode.

Before considering the drawings in detail, it should be noted that the present invention—in contrast to all the aforementioned ideas—is based on the principle, usable in several kinds of detectors, of influencing the charge carriers released from an electrode (the distribution of which is dependent upon the wavelength of the incident radiation) and on the material and thickness of the layer) in such a manner that the charge emission measured is independent of the wavelength and proportional to the time integral of the intensity, the photon or particle flux, or the dose imparted to a material. The following three physical properties are utilized:

(a) The range of the charge carriers released in the layer corresponds to their energy;

The yield of charge carriers released from the layer is dependent:

(b) On the layer material; and (c) On the thickness of the layer.

Referring more specifically to FIGURES 1, 1a and 1b of the drawings, if, for example, a layer $S_g$, as shown in FIGURE 1, with a high yield of charge carriers is placed between two layers $S_k$ having a smaller yield, as shown in FIGURES 1a and 1b, then, for radiation of a given quantum or particle energy, it is possible to give the resultant charge emission some value between the emission values of the layers having the greater and the smaller yields, by varying the thickness of the outer layers to make them relatively thin as compared with layer $S_g$, as shown in FIGURE 1a, or relatively thick with respect thereto, as shown in FIGURE 1b.

The arrangement will be explained with reference to a Geiger counter, as an example, for gamma radiation. FIGURE 2 shows plots of the emission (counts) per unit dose (E) as a function of photon energy P. If the electron emission of the layer $S_g$ is dependent on wavelength in accordance with curve A (e.g. if the layer is made of lead and has a thickness equal to the range of released electrons) in FIGURE 2, and the emission of the layer $S_k$ is dependent on wavelength in accordance with curve CGE (aluminum of a thickness equal to the range of released electrons), then an over-all wavelength dependency shown by curve CGH can be achieved, if the thickness of layers $S_k$ is suitably chosen. When adding up the curves A and CGH in order to obtain the mean emission of both layers, one has to take into consideration that the low energy components of curve A will be lowered by the electron filtering material more than the high energy components. Thus a correction is achieved similar to that obtained by the radiation filtering described above, but with the very important difference that all disadvantageous attendant phenomena inherent in radiation filtering are avoided. The steep drop in sensitivity toward the softer radiation region can be compensated for by a further thin layer having a higher yield. The thickness of this layer is such that it reacts substantially only to soft radiation (curve BFD in FIGURE 2). Then a wavelength dependency substantially as shown in curve BFGH is obtained, which can be "flattened" as desired by applying further compensating layers, in accordance with this electron filtering method (in contrast to radiation filtering).

Since the range of the released electrons is shorter by several orders of magnitude than that layer thickness which would absorb 50% of the incident photons releasing the electrons, no appreciable weakening of the primary radiation, which would be undesirable, occurs in the electron filters.

For example in Roentgen elements, materials of a medium atomic number, such as nickel, copper, or iron, have been proved for electron filters with good results.

In a specific example of a Roentgen element whose output is independent of wavelength between 80 kev. and 1.2 mev., the base electrode of 1 mm. thick lead is covered with an 80 mg./cm.$^2$ copper layer serving as an electron filter. The counter electrode consists of 5 mm. thick carbon material.

FIGURE 3 shows an embodiment of such a detector in the form of an ionization chamber, the general structure and circuitry of which are all known. A base electrode 2 which includes a filter layer 3, and a counter electrode 4 are mounted in a gas-filled vacuum vessel 1. The external circuit includes a voltage source 5 and measuring instrument 6. Charge carriers are released from the multi-layer electrode 2, 3, by the radiation to be measured and, if this electrode is constructed in accordance with the invention, the energy integral of these charge carriers is proportional to the value of the radiation characteristic to be measured. Some of the charge carriers released are withdrawn directly through the counter electrode. The rest of the energy so released produces ionization products in the gas, which products are then drawn off through both electrodes by means of the collecting voltage. This voltage amounts about 200 v. for low intensity measurements and up to several kv. for higher intensities. Very high intensities cannot be measured with an ionization chamber because the voltage or field strength would have to be chosen so high that avalanches of ionization would occur.

Thus this arrangement works as a counter tube and the ionization products produced by the charge carriers from the base electrode and multiplied by collision ionization are measured as individual current pulses. In this case the voltage to be applied is independent of the intensity and depends only on the characteristic of the counter tube. As a consequence of the "dead time" inherent in G.M.-tubes, intensities higher than about $10^5$ counts per second cannot be measured.

Finally, if the electrodes are in a vacuum cell, then this arrangement works as a "Semirad" (Secondary Electron Mixed Radiation Dosimeter), in which only the secondary electrons discharged from the cell walls can be measured, such a device having been described, for example, in "S. Kronenberg and H. M. Murphy, U.S. Army Signal Corps Exploratory Div. S, Memorandum Report, October 10, 1958," and only the actual charge carriers released from the electrodes are drawn off through the electrodes, by the auxiliary voltage, and measured. Special ionization chambers which are evacuated to a lower pressure than approx. $10^{-3}$ torr represent a "Semirad" for $\gamma$-rays (so called "vacuum chamber after Day). For neutron measurements, the walls of the "Semirad" are made of special material.

Figure 4:
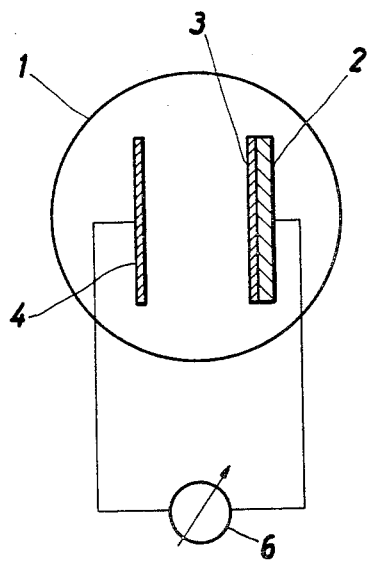
FIGURE 4 is a schematic view of another embodiment of the invention, in which the counter electrode has a relatively flat geometry.

In the radiation element construction shown in FIGURE 4, the counter electrode is made relatively flat, so that it collects as large a proportion as possible of the charge carriers released from the base electrode, and thus becomes charged.

This charge causes the low-energy charge carriers to be deflected back away from the counter electrode, so that only the high-energy charge carriers can reach it. In contrast to all of the detectors mentioned above, in which the charge emission of one large area electrode is collected on one comparatively very small electrode by means of an electrostatic field, in the radiation element one or both electrodes will emit charge carriers when irradiated, which carriers move to the opposite respective electrode due to their own kinetic energy. In this case, it is not even necessary for the individual base and counter electrodes to emit charge carriers in proportion to the radiation characteristic to be measured. Since only the current difference is measured, only this need be independent of wavelength. Nor is any source of electric energy needed with this circuit.

To measure electromagnetic radiation, particularly X-rays and gamma radiation, the electrons released from the electrodes by the radiation are used as charge carriers. Every material emits electrons when irradiated by X- or $\gamma$-rays, this being particularly true of materials with high and very low atomic numbers. The emission from material with a medium atomic number is relatively low and does not greatly vary as a function of radiation energy.

For measuring neutrons, the electrodes are made of materials which can be easily activated and which emit positrons or electrons as charge carriers during or after irradiation. Examples of these kinds of materials are natural isotopic compositions of silver, rhodium, or dysprosium.

In the construction of the radiation element for measuring electromagnetic radiation, such as the "Roentgen element," the base electrode must contain materials having a higher atomic number than the counter electrode, so that charging of the system may take place. Taking into account that an electrode with higher atomic number always repels a greater amount of electrons coming from the other electrode, the net electron transfer increases with the difference between the atomic numbers of the two electrodes. This difference should be as great as possible. Conveniently the electrodes consist, for example, of carbon and lead.

In the construction of the radiation element for measuring neutron radiation, all the materials which produce positive charge carriers upon being irradiated must be arranged in one electrode, and all the materials which produce negative charge carriers must be in the other electrode, so that the charging of the system is as great as possible.

Furthermore, the sensistivity of the radiation element can be increased by utilizing the back-scattering of the electrons incident on one electrode. Since back-scattering also increases with atomic number, the base electrode is made of a material with as high an atomic number as possible, and the other electrode from a material having as low an atomic number as possible.

In the same way, the release of secondary electrons at the radiation element can be used to amplify the measuring effect if a material having as high a secondary electron coefficient as possible is used for the electron-emitting electrode, and a material having as low a secondary electron coefficient as possible is used for the other electrode.

In order to make the detector as direction-independent as possible with respect to the incident radiation, the electrodes may, in the case of an ionization chamber, a "Semirad", or a radiation element, take the form of concentric, cylindrical, prismatic spherical or ellipsoidal shells. Examples of suitable electrode shapes are illustrated in section in FIGURES 5a to 5d, in which the envelope enclosing the electrodes is omitted for simplicity. These electrodes are mounted in gas-tight vessels, as described with respect to FIGURES 3 and 4.

In detectors in the form of ionization chambers, counter tubes, or "Semirads," the electrodes may be made so as to achieve directional independence by constructing only the base electrode in the form of a hollow cylinder or prism or spherical or ellipsoidal shell, the counter electrode being a wire arranged inside the hollow base electrode. This type of construction is shown in FIGURE 6.

As can be seen from FIGURE 3, the effects of radiation incident in directions A and B will differ. In the case of irradiation in direction A, the radiation which is strongly absorbed by the electrodes can impinge on the measurement side of the base electrode without being appreciably weakened. In the case of irradiation in direction B, on the other hand, the radiation must first pass through the whole base electrode, so that it is greatly weakened when it reaches the emitting surface. In detectors constructed as ionization chambers, counter tubes, or "Semirads," therefore, in order to reduce this absorption of radiation in the electrode, the base electrode may be constructed in the form of a hollow cylinder or prism or spherical or ellipsoidal shell, and the wire counter electrode may take the form of a loop, spiral, grid or net around the base electrode. Examples of this construction are shown in FIGURES 7a to 7d, in which the two-layer base electrode 7 is shown within the wire electrode 8 in each case.

Figure 8:
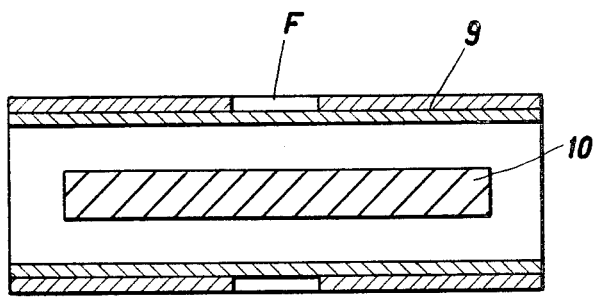
FIGURE 8 is a cross-sectional view of an embodiment of the present invention wherein the base electrode is provided with windows in its outer layer.

All detectors may also be improved by providing windows or holes in one or more layers of the multi-layer electrode, or by building it up from portions of materials which absorb the radiation to be measured either very slightly or not at all. The first case is illustrated in FIGURE 8, showing the counter electrode 10, and the base electrode 9 provided with windows F in its outer layer.

Another possibility is to make one of the layers of the outer layer electrode a vacuum seal, as a part of the vessel wall. If, in particular, lead or another material which outgasses a great deal is required as one of the layers of the outermost electrode, one can, according to the present invention, make one of the layers of the electrode which to the inside of the outgassing layer, such as the electron filter layer, vacuum tight. The lead will then lie outside of the vacuum chamber. The same holds true, substantively, for the inner electrode.

If one layer of the multi-layer electrode is made of photosensitive material, the detector will also be sensitive to the very long wavelength range of the electromagnetic spectrum, that is to say, to visible and ultraviolet light.

A radiation element is generally coupled to an idiostatic electrometer, which is very insensitive, particularly over the low-end of its measuring range. In radiation elements employing electrons as charge carriers, if the photosensitive layer is provided on the base electrode and is irradiated with visible or ultraviolet light through a suitable window, the electrometer will be charged to a constant bias voltage beyond its low sensitivity range before actual measurement of the ionizing radiation begins.

Figure 9:
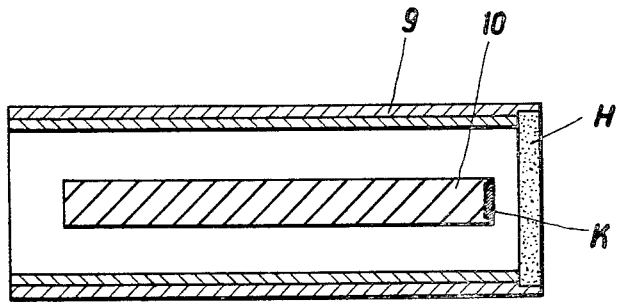
FIGURE 9 is a cross-sectional view of an embodiment of the invention, wherein a photosensitive layer is provided on the counter electrode.

On the other hand, if the photosensitive layer K is provided on the counter electrode 10, as shown in FIGURE 9, then it is possible to discharge the electrometer completely before starting a new measurement. This layer need only be irradiated with visible or ultraviolet light in order for discharge to occur. In this case, such irradiation is effected through a window H.

The reverse applies to radiation elements which employ positrons as charge carriers.

It will be understood that the above description of the present invention is susceptible to various modifications, changes and adaptations, and the same are intended to be comprehended within the meaning and range of equivalents of the appended claims.

What is claimed is:
1. A detector for direct and indirect ionizing radiation, said detector comprising, in combination:
   a first detector electrode and;
   a second detector electrode having several layers, at least one of which emits electrons when exposed to incident radiation, the spectrum of said electrons being a function of the quantum energy or kinetic particle energy of the incident radiation, said spectrum varying as a function of the material composition and thickness of the at least one layer, and at least one other of which layers has an energy-dependent filtering effect on electrons passing therethrough;
   each layer of said second detector electrode having a particular radiation-responsive electron emission characteristic and at least the layer nearest said first electrode having a particular electron filter characteristic for causing the electrons emitted by each layer to be filtered by any of the layers between the emitting layer and said first electrode to produce a net electron current between said electrodes whose level is independent of the energy distribution of incident radiation.

2. A detector as defined in claim 1, wherein the net electron current is proportional to the time integral of the intensity of the radiation.

3. A detector as defined in claim 1, wherein the net electron current is proportional to the photon flux of the incident radiation.

4. A detector as defined in claim 1, wherein the net electron current is proportional to the particle flux of the incident radiation.

5. A detector as defined in claim 1 wherein the net electron current is proportional to the dose, which is the energy absorbed per unit of a given material.

6. A detector as defined in claim 1, constructed as an ionization chamber, said detector including:
   means for containing said first and second electrodes in a gas atmosphere; and
   a voltage source connected between said electrodes externally of said containing means, for causing electrons emitted from the electrodes and gas ions produced thereby to be drawn to said electrodes, depending upon their charge, by the voltage source.

7. A detector as defined in claim 1, constructed in the form of a counter tube, wherein said first electrode is constructed in the form of a wire and is a counting electrode; said detector including:
   means for containing said first and second electrodes in a gas atmosphere; and
   a voltage source connected between said first and second electrodes externally of said containing means, the voltage of said source being sufficient to cause collision ionization between the emitted electrons and the gas molecules, so that the electrons, multiplied by the collision ionization, may be measured as individual current pulses.

8. A detector as defined in claim 1, constructed in the form of a Semirad, said detector including:
   means for containing said first and second electrodes in a vacuum; and
   a voltage source connected between said electrodes externally of said containing means, for causing any positive charge carriers released from said electrodes by incident radiation to be drawn toward one of said electrodes and the electrons so released to be drawn toward the other one of said electrodes.

9. A detector as defined in claim 1, wherein said first electrode is shaped as a large flat plate having an area substantially equal to the area of the counter electrode.

10. A detector as defined in claim 9 for detecting electromagnetic radiation, wherein said second electrode is the base electrode, and one or more of the layers of said base electrode is composed of a material having the highest permissible atomic number.

11. A detector as defined in claim 1, for detecting neutron radiation, wherein the effective capture cross-section of the electrode material, for conversion of neutrons into charged particles, is as high as possible.

12. A detector as defined in claim 11 wherein said charged particles are electrons.

13. A detector as defined in claim 11 wherein said charged particles are positrons.

14. A detector as defined in claim 1, for electromagnetic radiation, such as X-rays, wherein said second electrode includes predominantly materials having as high an atomic number as is permissible, and wherein said first electrode includes predominantly materials having as low an atomic number as is permissible.

15. A detector as defined in claim 9, for electromagnetic radiation, such as X-rays, wherein said second electrode includes predominantly materials having as high an atomic number as is permissible, and wherein said first electrode includes predominantly materials having as low an atomic number as is permissible.

16. A detector as defined in claim 11 for neutron radiation, wherein one of said first and second electrodes is composed predominantly of materials which emit positrons, and wherein the other of said electrodes is composed predominantly of materials which emit electrons, when the electrodes are exposed to incident radiation.

17. A detector as defined in claim 16, wherein said second electrode is composed predominantly of a material having a high back-scattering coefficient for positrons and electrons, and wherein the other electrode is composed predominantly of a material having a very low back-scattering coefficient for positrons and electrons.

18. A detector as defined in claim 17 wherein the secondary electron coefficient of the electrode composed predominantly of electron-emitting material is very high, and wherein the secondary electron coefficient of the predominantly positron-emitting electrode is very low.

19. A detector as defined in claim 1, wherein said first and second electrodes are constructed in the form of concentric shells, so that ionizing radiation may be measured substantially independently of its direction relative to the detector.

20. A detector as defined in claim 19 wherein said concentric shells are cylindrical in form.

21. A detector as defined in claim 19 wherein said concentric shells are prismatic in form.

22. A detector as defined in claim 19 wherein said concentric shells are spherical in form.

23. A detector as defined in claim 19 wherein said concentric shells are ellipsoidal in form.

24. A detector as defined in claim 1, wherein said second electrode is constructed in the form of a hollow shell and said first electrode is disposed within the hollow second electrode.

25. A detector as defined in claim 1, wherein said second electrode is constructed in the form of a hollow shell, and the first electrode is in the form of a wire structure surrounding said second electrode.

26. A detector as defined in claim 1, wherein at least one of the layers of the outermost electrode is provided with windows for permitting radiation to be measured to pass through these windows without being absorbed by the layer.

27. A detector as defined in claim 1, wherein at least one of the layers of the outermost electrode is provided with a portion of material which is transparent to substantially all incoming ionizing radiation.

28. A detector as defined in claim 1, wherein at least one of the layers of said second electrode includes a portion of photosensitive material which is responsive to long-wave electromagnetic radiation for emitting electrons.

29. A detector as defined in claim 26 wherein at least one layer of said second electrode is composed partly of electron-emitting long-wave radiation-responsive photosensitive material, so that upon exposure to visible or ultraviolet light, said electrodes will become charged relative to one another.

30. A detector as defined in claim 27 wherein at least one layer of said second electrode is composed partly of electron-emitting long-wave radiation-responsive photosensitive material, so that upon exposure to visible or ultraviolet light, said electrodes will become charged relative to one another.

31. A detector as defined in claim 26 wherein at least one layer of said second electrode is composed partly of positron-emitting long-wave radiation-responsive photosensitive material, so that upon exposure to visitble or ultraviolet light, said electrodes will become discharged relative to one another.

32. A detector as defined in claim 27 wherein at least one layer of said second electrode is composed partly of positron-emitting long-wave radiation-responsive photosensitive material, so that upon exposure to visible or ultraviolet light said electrodes will become discharged relative to one another.

33. A detector as defined in claim 6 wherein said means for containing said electrodes in a gas atmosphere includes one layer of the outermost electrode.

34. A detector as defined in claim 8 wherein said means for containing said electrodes in a vacuum includes one layer of the outermost electrode.

35. A detector as defined in claim 7 wherein said means for containing said electrodes in a gas atmosphere includes one layer of the outermost electrode.

36. In a detector for direct and indirect ionizing radiation, which detector has an electrode arrangement for absorbing ionizing radiation and including a base electrode acting essentially as a charge carrier emitter, and a counter electrode working essentially as a charge carrier collector, the improvement wherein at least one of said electrodes comprises, in combination:
    a plurality of layers, each layer being characterized by a spectrum of released charge carriers as a function of the hardness of radiation incident thereupon, said associated spectrum being a function of the material and the thickness of the layer,
    said layers being assembled in said electrode and being made of such material and having such thickness that the net transport of charge carriers between the two electrodes is proportional to a predetermined characteristic of the radiation incident thereupon and independent of the energy distribution of the incident radiation.

References Cited

UNITED STATES PATENTS

| | | | |
|---|---|---|---|
| 2,852,694 | 9/1958 | McCreary | 250—83.1 |
| 2,968,726 | 1/1961 | Bersin et al. | 250—83.1 |
| 2,988,639 | 6/1961 | Welker et al. | 250—83.1 |
| 2,994,773 | 8/1961 | Sternglass | 250—83.1 |
| 3,008,051 | 11/1961 | Pocock | 250—83.6 |
| 3,067,329 | 12/1962 | Linden | 250—83.1 |
| 3,092,747 | 6/1963 | Fine et al. | 250—83.1 X |
| 3,230,372 | 1/1966 | Spracklen | 250—83.6 |
| 3,238,369 | 3/1966 | Kronenberg | 250—83.1 |

RALPH G. NILSON, *Primary Examiner.*

A. B. CROFT, *Assistant Examiner.*